United States Patent [19]

Staal et al.

[11] Patent Number: 4,956,126
[45] Date of Patent: Sep. 11, 1990

[54] METAL-OXIDE-SILICA ADSORBENT AND PROCESS FOR REFINING OIL USING THE SAME

[75] Inventors: Leendert H. Staal, Parkgate, Great Britain; Jan C. Vis; Jan W. Groeneweg, both of Leyden, Netherlands

[73] Assignee: Unilever Patent Holdings B.V., Rotterdam, Netherlands

[21] Appl. No.: 282,057

[22] Filed: Dec. 9, 1988

Related U.S. Application Data

[62] Division of Ser. No. 124,864, Nov. 24, 1987, Pat. No. 4,812,436.

[30] Foreign Application Priority Data

Nov. 24, 1986 [GB] United Kingdom ................ 8628067
Jan. 16, 1987 [EP] European Pat. Off. ......... 872000575

[51] Int. Cl.$^5$ ........................... C11B 3/00; C11B 3/10
[52] U.S. Cl. ..................................... 260/428; 260/420
[58] Field of Search ............................... 260/420, 428

[56] References Cited

U.S. PATENT DOCUMENTS

| | | | |
|---|---|---|---|
| 2,777,822 | 1/1957 | Wilson, Jr. | 502/238 |
| 3,036,102 | 5/1962 | Pons et al. | 260/420 |
| 3,346,509 | 10/1967 | Stewart et al. | 502/238 |
| 3,568,840 | 3/1971 | Hashimoto | 210/198 |
| 3,650,989 | 3/1972 | Hindin et al. | 502/238 |
| 4,125,482 | 11/1972 | Sinha | 260/428 |
| 4,617,108 | 10/1986 | Shyr et al. | 502/235 |
| 4,648,975 | 3/1987 | Barkatt et al. | 502/411 |
| 4,734,226 | 3/1988 | Parker et al. | 260/420 |
| 4,812,436 | 3/1989 | Staal et al. | 502/407 |

FOREIGN PATENT DOCUMENTS

| | | | |
|---|---|---|---|
| 0053016 | 6/1982 | European Pat. Off. | |
| 0216730 | 4/1987 | European Pat. Off. | 502/407 |
| 2250422 | 10/1971 | Fed. Rep. of Germany | |
| 013631 | 7/1969 | U.S.S.R. | 502/407 |
| 1525811 | 9/1978 | United Kingdom | |

Primary Examiner—Patrick P. Garvin
Assistant Examiner—E. D. Irzinski
Attorney, Agent, or Firm—Cushman, Darby & Cushman

[57] ABSTRACT

The invention provides a synthetic, calcined metal-oxide-silica adsorbent of which at least 40% of its surface area is contained in pores with radius of at least 2 nm. The invention further provides a process for refining oil, wherein the oil is treated with the absorbent as a bleaching solid. The adsorbent can be regenerated by calcination without substantial loss of activity.

20 Claims, 2 Drawing Sheets

METAL-OXIDE-SILICA ADSORBENT AND PROCESS FOR REFINING OIL USING THE SAME

This is a division of application Ser. No. 07/124,864, filed Nov. 24, 1987, now U.S. Pat. No. 4,812,436.

The present application relates to a process for refining oil by treatment of the oil with a bleaching solid and to a synthetic metal-oxide-silica adsorbent that can suitably be used as bleaching solid in such a process.

The refining of oil by treatment with a bleaching solid is often referred to as bleaching. The purpose of the treatment is not only to remove coloured matter, such as carotenoids and chlorophylls, but also to remove other materials, for example residual phosphatides, soap, gums, metals and oxidation products. For example, it is thought that by bleaching edible oil, oxidation products can be removed, which are themselves tasteless but which would be converted into bad tasting products upon continued oxidation, and that thus taste deterioration can be avoided. In the bleaching treatment, similarly thermally instable precursors of coloured substances can be removed and colour reversal in a subsequent heat treatment, for example a deodorization treatment, can thus be prevented.

It has been common practice for decades to carry out the bleaching process with the use of natural or acid-activated bleaching earth or clay as the bleaching solid. Acid-activated clays generally have a higher bleaching capacity than natural clays. They can be prepared by subjecting clays consisting mainly of minerals belonging to the montmorillonite group to a treatment with sulphuric or hydrochloric acid.

The clays that are used as bleaching earths generally contain substantial amounts of inactive minerals. The amount thereof may be as high as 30 or 40%. This part of the clay does not significantly contribute to the refining of the oil. However, when after the treatment the bleaching clay is removed again, the inactive part of the clay does entrain oil and it, thereby, does add to the oil losses.

Many attempts have been made to improve the bleaching process. One of the main cost-determining factors of the process is the loss of oil during the separation step. The cost of the bleaching adsorbent is often exceeded by that of the oil lost by retention in the adsorbent spent. This oil is difficult to recover and, after recovery, can be badly oxidized and is often of poor quality. Hence, the spent earth is often discarded without treatment. To reduce such losses it has been tried to increase the bleaching activity of the bleaching adsorbents to allow smaller quantities of adsorbent to be used. The need for highly active bleaching substances has become more urgent in recent years. It has been recognized that for environmental reasons the amount of waste material to be discarded should be minimized.

It has been proposed to employ instead of a natural clay (which may have been chemically activated e.g. by treatment with acid), synthetic adsorbent material as the bleaching solid.

An advantage of employing synthetic material as the bleaching solid, thereby avoiding the use of natural products or products directly derived therefrom, is that the presence of inactive material can be prevented. Another advantage is that the purity of the bleaching solid can be controlled more easily and the presence of contaminants that cause unfavourable side reactions can be avoided.

In GB No. 1,349,409 it is proposed to use as the bleaching solid synthetic silicate adsorbent material, which has been prepared by reacting an acid-free aqueous salt solution that contains divalent and/or trivalent metal ions, with an aqueous solution of an alkali metal silicate at a temperature ranging from room temperature to the boiling point of the aqueous reaction medium at atmospheric pressure under conditions such that a silicate precipitate is obtained, neutralising and removing the alkaline material of the precipitate and subsequently drying the precipitate. The dried precipitate should have a calculated $SiO_2$ content of 60-80 wt. %. The drying is preferably carried out at a temperature below 130° C., usually at about 110° C. According to the specification the adsorptive power of the precipitation products may be improved by means of an acid treatment. It is stated that the adsorption capacity of the products is mainly determined by the specific surface and the proportion of micropores. Typically the specific surface is between 300 and 600 $m^2/g$. The fraction of micropores, which are described as pores having a mean diameter of 0-80 nm or of 0-14 nm, should be large.

It has now been found that, to obtain a good bleaching performance, a substantial part of the surface area of the synthetic metal-oxide-silica adsorbent should be provided by pores with radius of at least 2.0 nm; in particular by pores with radius of 2.0-4.0 nm. Pores having a radius less than 2.0 nm do not contribute substantially to the bleaching action. On the other hand, pores with a radius larger than 4.0 nm should be present to ascertain the accessibility of the smaller pores. For the bleaching function of the synthetic metal-oxide-silica to be optimal, the availability of a substantial specific surface area in pores with radius of 2.0 nm or more is crucial. A substantial part of this surface area should preferably be contained in pores with radius of 2.0-4.0 nm.

In the metal-oxide-silica's according to GB No. 1,349,409 a substantial fraction of the pores has a radius of less than 2.0 nm. When determining the specific surface area contained in pores up to a certain size, e.g. by means of a nitrogen adsorption isotherm, for the products according to GB No. 1,349,409, and plotting the cumulative specific surface area, for example expressed as percentage of the total specific surface area, against the logarithm of the pore radius, generally a concave (i.e. a function of which the second derivative is not positive), increasing graph is obtained. In some cases the relationship between the cumulative surface area and the logarithm of the pore radius is close to linear, up to a cumulative surface area of e.g. 80 or 90% of the total surface area. In all cases the slope of the plot between pores with radius of 2.0 and 4.0 nm is relatively small.

It has now been found that good bleaching results can be obtained when using as the bleaching solid a metal-oxide-silica adsorbent having only a relatively small part of its surface area in pores with radius smaller than 2.0 nm but having a fairly large specific surface area in pores with radius of 2.0 nm or more, in particular in pores with radius of 2.0 to 4.0 nm. In particular suitable results can be obtained when using a metal-oxide-silica adsorbent with an adequately large total specific surface area, having a pore size distribution such that the plot of the percentage cumulative surface area against the logarithm of the pore radius has a shape resembling an S-curve, with a relatively steep increase at pore radius above 2.0 nm and in particular between pore radius of 2.0 and 4.0 nm, indicating that only a small part of the surface area is contained in very small pores and that a relatively large part of the surface area is provided by pores with radius of 2.0–4.0 nm.

It has also been found to be beneficial for the bleaching results if the metal contained in the metal-oxide-silica consists for a substantial part of metal that can have an oxidation state higher than 2.

It has further been found that, whereas the bleaching solids according to GB No. 1,349,409 are to be used only once, adequate bleaching results can be achieved with repeated use of calcined metal-oxide-silica having the above described properties. After the use of the calcined metal-oxide-silica adsorbent as the bleaching solid in an oil refining process the metal-oxide-silica adsorbent can be regenerated yielding a bleaching solid with adequate bleaching activity, by a repeated calcination. GB No. 1,349,409 teaches not to subject the metal-oxide-silica to temperatures higher than 130° C. The regeneratability of the present bleaching solids allows the repeated use as bleaching solid which results in a substantial reduction of spent material. This not only substantially reduces the average costs of the bleaching process, but also the amount of spent bleaching solid to be discarded. Thus, the present invention provides a significant contribution to solving this environmental problem.

According to a first aspect, the present invention provides a synthetic calcined metal-oxide-silica adsorbent of which at least 40% of its surface area is contained in pores with radius of at least 2.0 nm. Preferably, the metal-oxide-silica has at least 50%, more preferably at least 55% of its surface area contained in pores with radius of at least 2.0 nm. It is further preferred for the metal-oxide-silica to have a specific surface area in pores with radius of 2.0–4.0 nm of at least 90 m$^2$/g. Preferably, at least 50 mole % of the metal contained in the metal-oxide-silica is a metal that can have an oxidation state higher than 2. The present metal-oxide-silica adsorbent is particularly suitable for use as the bleaching solid in a process for refining oil.

Accordingly, the present invention provides in a second aspect, a process for refining oil by treatment of the oil with a bleaching solid wherein as the bleaching solid is used the above-described synthetic metal-oxide-silica adsorbent.

The metal-oxide-silica adsorbent is especially suitable for the repeated use as the bleaching solid according to the present process. However, when using the metal-oxide-silica adsorbent for the first time in the present process, not in all instances need it be calcined, but then the surface properties of the regenerated material should be checked before employing it again as bleaching solid in a next run.

The present metal-oxide-silica adsorbents can have a high bleaching activity. Consequently, satisfactory bleaching results can be obtained using only a small amount of bleaching solid. In this way the present invention not only contributes to solving the environmental problem by reducing the amount of spent material to be discarded, it also allows the oil losses to be reduced, thereby reducing the costs of the bleaching process. Alternatively, the present process can be used to improve the refining quality without causing an increase in oil loss or waste material.

As described above, the surface area contained in pores below a certain size does not, we believe, contribute to the bleaching action of the metal-oxide-silica. It is therefore, especially preferred for the metal-oxide-silica to have at least 60% of its surface area contained in pores with radius of at least 2.0 nm.

As referred to herein, the surface area of the metal-oxide-silica is determined according to conventional procedures, from nitrogen adsorption at liquid nitrogen temperature (77° K). Because of the occurrence of pore interconnectivity, the adsorption isotherm is employed rather than the desorption data. The total specific surface area is calculated from the experimental gas adsorption data using the BET theory. In the determination of the surface area in relation to the pore size distribution the conventional assumption of cylindrical pores is made. An adequate description of the experimental procedure, the data processing and the theoretical basis is given by S. Lowell and J. E. Shields in Powder Surface Area and Porosity, second edition 1984, edited by B. Scarlett and published by Chapman and Hall, London, in the Powder Technology Series.

The metal-oxide-silica preferably has a specific pore volume in pores with radius up to 2000 nm of at least 0.5 ml/g. We believe that adequate bleaching results can be obtained with metal-oxide-silica's having such a specific volume in pores of the indicated size, because relatively easy access is provided to the surface area in the smaller pores thereby allowing rapid adsorption to take place on that surface and thus, preventing substantial reduction in the rate of adsorption owing to diffusion limitation.

The specific volume as referred to herein is determined using conventional methods by means of mercury porosimetry measurement, using the intrusion data. The specific volume in relation to the pore size distribution is obtained using again the cylindrical pore shape model. An adequate description of the relevant procedures is also given by Lowell and Shields in the publication cited above.

Preferably 50–100 mole % of the metal contained in the metal-oxide-silica is a metal that can have an oxidation state higher than 2. The metal contained in the metal-oxide-silica need not actually be in the oxidation state higher than 2, but the metal should preferably be of the type that can occur in such higher oxidation state. Thus, for example, iron is suitable, Whether it occurs in the metal-oxide-silica with oxidation state 2 or 3. Alternatively, metal-oxide-silica in which the metal consists essentially entirely of e.g. zinc or calcium having only the oxidation state 2, is not preferred.

The amount of metal that can have an oxidation state higher than 2, preferably is at least 70 mole % of the metal contained in the metal-oxide-silica. The balance of the metal contained in the metal-oxide-silica preferably consists essentially of alkaline earth metal, in particular of magnesium.

The metal that can have an oxidation state higher than 2, preferably is metal that can occur in the oxidation state 3 and, preferably, it is metal having an atomic number in the range 13–40. Particularly preferred are aluminum, iron, zirconium, cobalt and manganese and mixtures of two or more thereof; aluminum being most preferred.

The specific surface area of the metal-oxide-silica in pores with radius of 2.0–4.0 nm is preferably 100–500 m$^2$/g, more preferably 110–400 m$^2$/g.

The specific pore volume in pores with radius up to 2000 nm is preferably 0.7–5 ml/g, more preferably 1.5–4 ml/g.

The metal-oxide-silica preferably is X-ray amorphous, by which is meant that it does not exhibit X-ray interferences, e.g. in a Debije-Scherrer diagram. The present metal-oxide-silica bleaching solid may contain some crystalline or microcrystalline material. However, we believe that such material does not contribute to the bleaching action and therefore its presence is not preferred. On the other hand, such (micro)crystalline material need not adversely affect the results of the refining process (apart from causing some increase in the oil losses). The presence in small amounts of such, essentially inert, crystalline or microcrystalline material in the metal-oxide-silica bleaching solid can, therefore, be tolerated.

Alternatively, in the refining process the, preferably amorphous, metal-oxide-silica adsorbent to be used as the bleaching solid, may be used in admixture with other material, for example filter aid, to facilitate a subsequent filtration, or activated carbon, which other material may be crystalline. For example zeolites may be used in combination with the metal-oxide-silica bleaching solid. However, it is preferred that when using such mixtures, more than 50 wt. % thereof consists of metal-oxide-silica bleaching solid. More preferably the metal-oxide-silica is employed without such admixtures, because such admixtures cause an increase of oil loss to occur, owing to entrainment of oil in the filtration stage.

Preferably, the total specific surface area of the metal-oxide-silica is at least 150 m$^2$/g, more preferably it is 200-600 m$^2$/g, a total specific surface area of 250-550 m$^2$/g being particularly preferred.

It is further preferred for the specific pore volume of the metal-oxide-silica in pores with radius in the range of 100-2000 nm to be at least 0.5 ml/g; more preferably it is 0.7-3 ml/g, a specific pore volume in such pores of 0.9-2 ml/g being especially preferred.

To allow the metal-oxide-silica to have favourable filtration characteristics on the one hand and to allow the adsorption to take place rapidly on the other hand, it is preferred for the metal-oxide-silica to have a particle size, indicated as the volume weighted mean diameter, between 1 and 250 μm.

Preferably, the volume weighted mean diameter of the metal-oxide-silica particles is 5-100 μm, more preferably it is 5-50 μm. The particle size distribution of the metal-oxide-silica can suitably be determined with, for example, an Elzone 80 XY ® instrument.

The metal content of the metal-oxide-silica calculated as mole fraction of the total metal plus silicon content, preferably is in the range of 0.04 to 0.5, more preferably it is 0.1-0.3, a metal content expressed as mole fraction, between 0.13 and 0.23 being particularly preferred.

The sodium content of the metal-oxide-silica preferably is as low as possible. Suitably it is less than 1 wt. %, a sodium content of less than 0.5 wt. % being preferred.

Although adequate bleaching results can be obtained in the present refining process with the use of uncalcined metal-oxide-silica bleaching solid, it is preferred to carry out the process with the use of the present calcined metal-oxide-silica adsorbent as the bleaching solid. The calcined metal-oxide-silica adsorbent that is employed may be freshly prepared or it may be material that has already been used as the bleaching solid in a previous refining process and that has been regenerated by calcination.

The treatment as such of the oil with the bleaching solid in the present process, can be carried out in a conventional manner, choosing contact time, temperature and equipment to be used in dependence of the type and quality of oil to be refined. Suitably, the treatment of the oil with the bleaching solid in the present process comprises contacting the oil and the bleaching solid and maintaining the contact at elevated temperature. Preferably, the oil is held in contact with the bleaching solid at a temperature of at least 40° C., more preferably at a temperature of 50°-200° C. The amount of bleaching solid with which the treatment is carried out suitably is 0.05-10% calculated on the weight of the oil. Preferably 0.1-5% of bleaching solid, calculated on the weight of the oil to be treated, ia employed. The contact time of oil and bleaching solid may be only one or two minutes, but usually a contact time between about 5 minutes and about 2 or 3 hours can adequately be employed. In most cases, adsorption on the bleaching solid will be completed well within about 20 or 30 minutes, depending inter alia on the temperature employed, but longer contact times do not normally adversely affect the quality of the oil obtained. After the oil and bleaching solid have been in contact for an adequate period of time at a suitable temperature, refined oil can be recovered from the admixture by removing the bleaching solid with adsorbed contaminants therefrom. This can be done in a conventional manner, for example by filtration. The refined oil can for example suitably be recovered by filtering the admixture of oil and bleaching solid using a plate and frame filter press. Alternatively, the bleaching solid with adhering contaminents can suitably be separated from the admixture to yield refined oil, e.g. by means of centrifugation.

The present process is particularly suitable for refining fatty oil. Alternatively, other oils such as mineral oil can be used, but preferably the oil in the present process is fatty oil. "Fatty oil" means to include oils such as glyceride oil, e.g. palm oil, fish oil and non-edible tallow, as well as edible but indigestible or only partially digestible oils, e.g. waxes such as jojoba oil, drying oils such as tall oil and mixtures of oils. Preferably, the oil in the present process is glyceride oil in particular edible triglyceride oil. An advantage of the present process, especially when applied to refine glyceride oil, is that an improved removal of sulphur-containing compounds can be obtained, as compared with the removal of such substances when using conventional bleaching earths. Removal of sulphur-containing compounds is important, in particular to prevent poisoning of the catalyst to occur, if the refined oil is subsequently to be hydrogenated.

When the oil to be refined is edible triglyceride oil, usually the use of about 0.3-2 wt. % bleaching solid, calculated on the weight of the oil, is adequate. The bleaching temperature is then preferably chosen between about 85° C. and about 135° C. For the refining of different oils, however, different conditions may be more appropriate. For example, for the bleaching of non-edible tallow preferably higher amounts of bleaching solid, e.g. about 4 wt. %, are used.

The optimal choice of metal-oxide-silica to be employed, in particular regarding the metals contained therein, also depends on the oil to be refined. For example, for the refining of oils which are sensitive to oxidation, e.g. highly unsaturated edible triglyceride oils such as fish oil and soybean oil, preferably a bleaching solid is employed that does not contain a substantial amount of metal that may act as catalyst in the oxidation reaction such as iron and copper. For such oils, preferably a metal-oxide-silica is used in which the metal consists substantially completely of aluminum.

The present process can suitably be carried out in the presence of other substances. For example, it can be beneficial to refine glyceride oil by the present process in the presence of added acid, e.g. citric acid or phosphoric acid. The acid can be admixed with the oil simultaneously with the bleaching solid. The acid and the bleaching solid can be admixed with the oil together, e.g. as a slurry, but preferably they are contacted with the oil separately. Alternatively, the acid can suitably be added before or after admixing the oil and the bleaching solid.

The metal-oxide-silica can be prepared in several ways. It can, for example, suitably be prepared via co-precipitation of metal ions with silicate, followed by prolonged ageing, washing, drying and, preferably, calcination. A preferred process for the preparation of the synthetic metal-oxide-silica is by means of stepwise precipitation. In this process first a silica hydrosol is prepared. Silica is caused to precipitate by admixing an aqueous silicate solution and acid under intensive mixing. Very small precipitate particles are formed. These particles are allowed to agglomerate to an aggregate structure. In the thus formed silica hydrogel metal ions are incorporated by addition of the metal ions in the form of a suitable salt solution. The product is then filtered, washed and dried, e.g. spray dried. If in the preparation sodium has been used, for example by using sodium silicate as starting material, then preferably the product is ion exchanged and filtered, washed again and dried.

For example, for the preparation of alumina-silica the following process has been found to be very suitable. An aqueous solution of sodium silicate is contacted in a first stirred reactor with a sulphuric acid solution such that a pH of about 8-11, preferably 9.0-10.5 is obtained. The residence time in the first reactor is not critical. Suitably a residence time of about 5 seconds to 5 minutes is chosen. The admixture is then passed to a second reactor providing for a residence time of about 10 minutes to 2 hours. The formed silica hydrogel is then passed to a third reactor. In this reactor, aqueous aluminum sulphate solution is admixed and sodium hydroxide is added to adjust the pH to about 4-6. The residence time in this reactor is about 10-30 minutes. Subsequently the product is filtered off. The temperature in the three reactors suitably is between about 20° and 80° C. and the process is preferably carried out at atmospheric pressure. The obtained filter cake is washed, preferably at least twice, with hot water. To effect ion exchange it is subsequently reslurried in, for example, a 10% ammonium carbonate solution, allowed a contact time of about 30 minutes or more, filtered and washed again with hot water. Subsequently, the product is dried, preferably by spray-drying.

Preferably, the product is calcined by heating it. Adequately, it is heated for at least about 10 minutes at a temperature of at least about 300° C. Preferably, a temperature of about 400°-1000° C. is used, more preferably of 500°-900° C. When the calcination is carried out to regenerate metal-oxide-silica that has already been used as bleaching solid in an oil refining process, then preferably a temperature of at least about 550° C., more preferably at least 600° C. is employed. The optimal duration of the heat treatment depends on the temperature, at higher temperatures shorter times being sufficient. The desirable residence time further depends on the heat transfer and the atmosphere. For example, relatively short times can be sufficient when using a rotary calciner. When applying, for example, a tray oven at 700° C. usually a duration of ½-1 hour is adequate. The calcination preferably is carried out in equipment that allows gas circulation and removal of evaporation and combustion products.

The calculated silicon dioxide content of the employed sodium silicate solution suitably is chosen between about 3 and about 10 wt. %. The concentration of the sulphuric acid solution used to control the pH in the first reactor, is not critical. Concentrations between about 1 and about 6N can suitably be used. Instead of sulphuric acid, nitric acid or another acid can adequately be used to control the pH in the first reaction stage. Similarly, instead of sodium hydroxide, another base can be employed to adjust the pH in the third reactor; for example ammonia can suitably be used. The concentration of base and of aluminum sulphate solutions employed are not critical. For example, a 4N sodium hydroxide and an aluminumsulphate solution having a calculated $Al_2O_3$ content of 5 wt. % can be employed. The process can be carried out batchwise or in a continuous manner.

EXAMPLE 1

Alumina-silica was prepared using the general stepwise precipitation procedure described above. Starting from neutral waterglass (38-40 Bé), a sodium silicate solution with a calculated silicon dioxide content of 5 wt. % was prepared. The pH in the first reactor was adjusted to about 10.4 using a 4N sulphuric acid solution. In the first and second reactor the temperature was 30° C. and the residence times were 45 seconds and 55 minutes respectively. In the third reactor aluminum sulphate solution with a calculated alumina content of 5 wt. % was introduced and the pH was adjusted to 4.5 using a 4N NaOH solution. The temperature in the third reactor was also 30° C. and the residence time was 18 minutes. The product was then filtered off. The filter cake was reslurried with water of 75° C., and filtered again. This washing step was repeated once more. The cake was then reslurried in a 10% ammonium carbonate solution. The dispersion was stirred for 1 hour at room temperature, and filtered. The cake was then washed again with hot water twice. It was then reslurried with water to give a dispersion comprising about 5-10% dry material and the dispersion was spray dried. The product was then calcined by heating it for 1 hour at 700° C. in an oven allowing air circulation.

Figure 1:
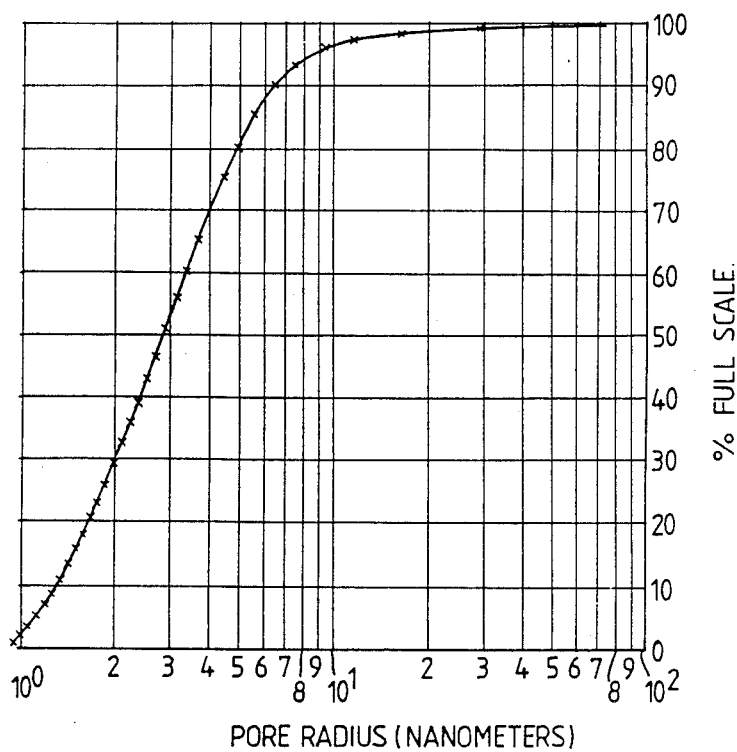
FIGS. 1 to 4 graphically illustrate features of the metal oxide-silica adsorbent of the invention.
Figure 2:
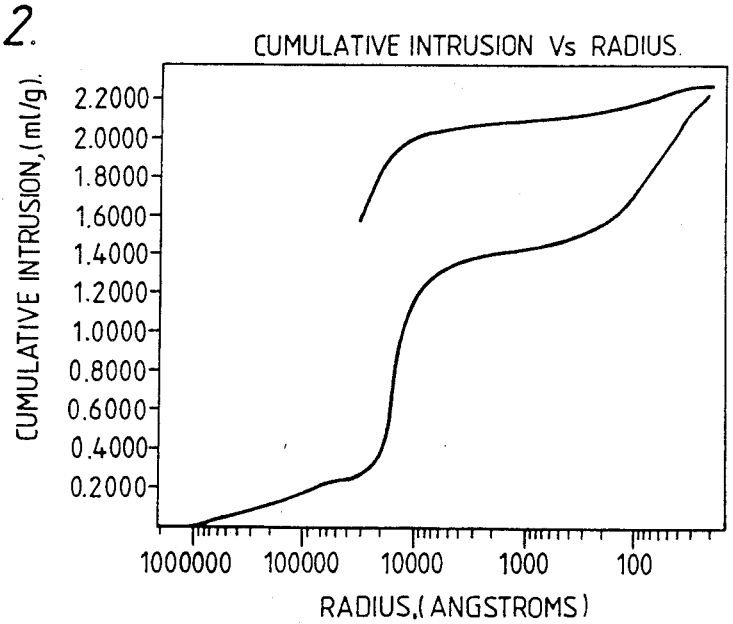

The alumina-silica obtained was analyzed. The aluminum content, expressed as mole fraction of the total metal plus silicon content was 0.14. The silicon dioxide content in the product was 80.5 wt. %. The sodium content of the silica-alumina was 0.3 wt. %. The total specific surface area was 442 m²/g. The cumulative surface area in pores up to a certain size, indicated as percentage of the total surface area is shown in FIG. 1. As can be seen from FIG. 1, about 30% of the surface area was contained in pores with radius smaller than 2.0 nm. Consequently, the alumina-silica had about 70% of its surface area outside such pores. About 70% of the surface area was provided by pores up to a radius of 4.0 nm. Accordingly about 40%, corresponding to a specific surface area of 177 m²/g, was provided by pores with radius between 2.0 and 4.0 nm. In FIG. 2 the cumulative intrusion plotted against the pore radius, as determined by mercury porosimetry is shown. From this figure can be seen that the specific volume in pores with radius up to 2000 nm was about 1.8 ml/g and in pores with radius of 100–2000 nm it was about 1.0 ml/g. The product was X-ray amorphous. The volume weighted mean diameter of the particles was 7.7 μm.

The alumina-silica was used to refine neutralized rapeseed oil. The alumina silica was admixed with the oil at 90° C. After 20 minutes the admixture was filtered. The bleaching performance was evaluated by recording the absorption spectra before and after the treatment at 380–520 nm and at 630–700 nm. The absorbance at 447 nm and at 667 nm were used as indicative for the presence of yellow (carotene) and green (pheophytin, chlorophyll) pigments, respectively. The oil treatment was carried out twice, once with 1.0% of bleaching solid and once with 0.5% of bleaching solid, calculated on the weight of the oil.

The refining treatment with 1% solid removed 96% of the yellow pigments and 93% of the green pigments. When using 0.5% solid the pigment removal was 88 and 85% for the yellow and the green pigments, respectively.

For comparison, the oil treatment was repeated using as bleaching solid Tonsil ACCFF®, an acid-activated bleaching clay. The experiments were carried out in duplo, using two different batches of clay. The averaged results when using 1 wt. % clay on oil were 91 and 86% removal of yellow and green pigments, respectively. When using 0.5 wt. % clay, the removal was 70 and 52% of the yellow and green pigments, respectively.

Figure 3:
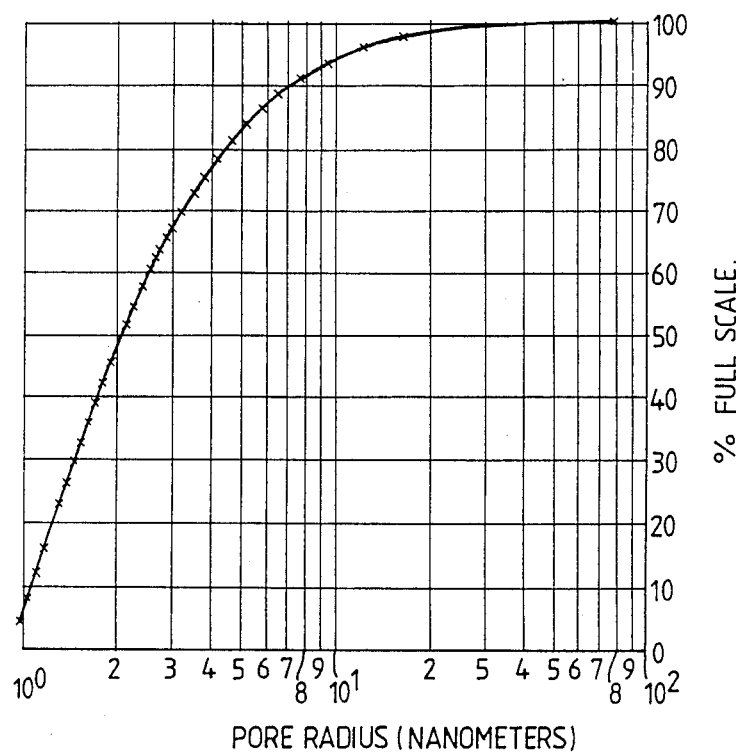

For comparison, alumina-silica was prepared according to example 9 of GB No. 1,349,409. The total specific surface area of the product obtained was 203 m²/g. The cumulative surface as percentage of the total surface area, plotted against the pore radius is shown, in FIG. 3. The plot shows that almost 50% of the surface was contained in pores with radius smaller than 2.0 nm and that 29%, corresponding to a specific surface area of only about 60 m²/g was provided by pores with radius between 2.0 and 4.0 nm.

Figure 4:
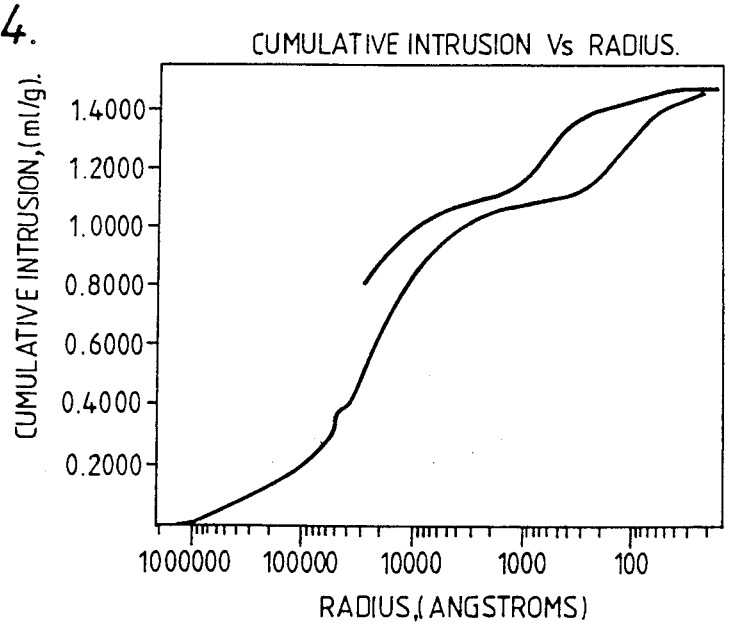

The cumulative intrusion in dependence of the pore radius is shown in FIG. 4. The specific pore volume in pores with radius up to 2000 nm was about 0.8 ml/g and in pores with radius of 100–2000 nm was about 0.4 ml/g. With the use of this alumina silica as bleaching solid in the refining of the neutralized rapeseed oil, after 20 minutes at 90° C., when using 1% alumina silica, calculated on the weight of the oil, the yellow and green pigment removal was only 28 and 17% respectively.

EXAMPLE 2

A series of bleaching processes was carried out wherein the contact time between the oil and the bleaching solid was varied. The processes were carried out at 90° C., using neutralized rapeseed oil and alumina silica as described in Example 1. 1% of bleaching solid, calculated on the weight of the oil was employed. For comparison, the experiments were repeated using Tonsil ACCFF as bleaching solid. The results are shown in Table 1.

The results show that with the present alumina silica not only a more complete pigment removal is obtained, but also that it is obtained more rapidly.

TABLE 1

| contact time (min.) | pigment removal (%) | | | |
|---|---|---|---|---|
| | alumina silica | | Tonsil ACCFF | |
| | yellow | green | yellow | green |
| 1 | 85 | 83 | 42 | 32 |
| 5 | 93 | 87 | 67 | 54 |
| 10 | 94 | 89 | 78 | 59 |
| 20 | 95 | 92 | 85 | 74 |
| 40 | 96 | 93 | 90 | 85 |

EXAMPLE 3

Alumina-silica was prepared using a procedure similar to the one described in Example 1. The pH in the first two reactors was 10.1 and the residence times in the second and third reactor were 50 and 10 minutes respectively. The aluminum content of the resulting product was 18 mole % of the total metal plus silicon content. The product contained 75.3 wt. % silicon dioxide, calculated from the silicon content. The product contained 0.22 wt. % sodium. The specific surface area contained in pores with radius between 2.0 and 4.0 nm was 186 m²/g. 64% of the surface occurred outside pores with radius smaller than 2.0 nm. The total specific surface area was 423 m²/g. The product was X-ray amorphous.

This alumina-silica was used to refine neutralized rapeseed oil. After a contact time of 20 minutes at 90° C., using only 0.5 wt. % bleaching solid on oil, 83% of the yellow pigments and 90% of the green pigments had been removed.

EXAMPLE 4

An aluminum-iron-oxide-silica was prepared as described in Example 3, but the sulphuric acid solution contained in addition some iron (II) sulphate. The aluminum and iron content of the resulting product, expressed as mole fraction of the total metal plus silicon content were 0.18 and 0.02, respectively. The specific surface area contained in pores with radius of 2.0–4.0 nm was 124 m²/g. 35% of the surface area was contained in pores with radius smaller than 2.0 nm. Consequently 65% of the surface area occurred outside such pores. The total specific surface area was 353 m²/g. The volume weighted mean diameter of the particles was 12.6 μm. The product was X-ray amorphous When using 0.5 wt. % of this aluminum-iron-oxide-silica to bleach neutralized rapeseed oil after 20 minutes at 90° C., 93% of the yellow pigments and 85% of the green pigments had been removed.

EXAMPLE 5

Alumina-silica was prepared using the procedure as described in Example 1, but ammonia was employed for pH control in the third reactor. In the first and second reactor the pH was about 9.5; in the third reactor it was kept at about pH=5. The material leaving the third reactor was filtered, the cake was reslurried in water and then spray dried. The resulting product was washed once with hot water, then ion exchanged with an ammonium sulphate solution and subsequently washed again with hot water. Then the product was reslurried with water once more, then flash dried, milled and finally calcined.

The alumina-content of the resulting product, expressed as mole fraction of the metal plus silicon content was 0.15. The silicon dioxide content of the product was 78 wt. %. The product contained 0.02 wt. % sodium.

The specific surface area in pores with radius of 2.0–4.0 nm Was 240 m²/g. 75% of the surface area occurred outside pores with radius smaller than 2.0 nm. The total specific surface area was 440 m²/g. The volume weighted mean diameter of the particles was 10.5 μm. The product was X-ray amorphous.

This alumina-silica was used to refine neutralized rapeseed oil by admixing 1 wt. % of the bleaching solid with the oil at 90° C. and maintaining the admixture for 20 minutes at that temperature before filtering it. From the refined oil, 95% of both the green and the yellow pigments had been removed by the treatment.

EXAMPLE 6

A series of alumina-silica's was prepared as described in Example 5, but the calcination temperature was varied. Calcination was carried out at 700, 800 and 900° C. The resulting products were used to bleach neutralized rapeseed oil using 0.5 wt. % of the bleaching solid. The bleaching time and temperature were 20 minutes and 90° C., respectively. The bleached oil was subsequently deodorised. The colour of the oil before and after deodorisation, was measured using the Lovibond method. For comparison, the refining treatment was also carried out using 0.B wt. % of Tonsil ACCFF as bleaching solid. The results are shown in Table 2. In Table 2 also the results are shown that were obtained using only 0.4% of the alumina-silica that was calcined at 700° C. (The Lovibond colours (using a 5¼" cell) of the neutralized rapeseed oil before the bleaching were 80, 8.0 and 3.5 for Yellow, Red and Blue, respectively.)

TABLE 2

| Bleaching solid/ Calcination temp (°C.) | Amount bleaching solid (wt. %) | Lovibond colours (5¼") | | | | | |
|---|---|---|---|---|---|---|---|
| | | Before deod. | | | After deod. | | |
| | | Y | R | B | Y | R | B |
| 700 | 0.4 | 60 | 6.0 | 0 | 17 | 1.7 | 1.0 |
| 700 | 0.5 | 51 | 5.1 | 0 | 16 | 1.6 | 0.6 |
| 800 | 0.5 | 40 | 4.1 | 0 | 8 | 0.8 | 0.2 |
| 900 | 0.5 | 47 | 4.7 | 0 | 12 | 1.2 | 0.4 |
| Tonsil ACCFF | 0.8 | 29 | 2.9 | 0 | 7 | 0.7 | 0.1 |

Table 2 shows that the colour of the deodorised oil obtained after bleaching with only 0.5% of the product calcined at 800° C. is essentially the same as that obtained with the use of 0.8 wt. % of the reference bleaching clay.

The refined oils were analyzed for their contents of chlorophyll, carotene, iron, phosphorus and sulphur. The contents of chlorophyll, carotene and sulphur containing compounds were determined before and after deodorization. The contents of the other components do not change during deodorization and were only determined before the deodorization. For all samples the phosphorus content was less than 2 mg/kg oil. The results for the other components are shown in Table 3.

TABLE 3*

| Bleaching solid/calc. temp (°C.) | Amount bleaching solid (wt. %) | chlorophyll | | carotene | | Fe | S | |
|---|---|---|---|---|---|---|---|---|
| | | nb+ | nbd+ | nb | nbd | | nb | nbd |
| 700 | 0.4 | 3 | 3 | 3 | 0 | ≦0.01 | 11 | 7 |
| 700 | 0.5 | 3 | 3 | 3 | 0 | ≦0.01 | 11 | 6 |
| 800 | 0.5 | <1 | <1 | 1 | 0 | ≦0.01 | 11 | 4 |
| 900 | 0.5 | 3 | 3 | 2 | 0 | ≦0.01 | 12 | 4 |

TABLE 3*-continued

| Bleaching solid/calc. temp (°C.) | Amount bleaching solid (wt. %) | chlorophyll | | carotene | | Fe | S | |
|---|---|---|---|---|---|---|---|---|
| | | nb+ | nbd+ | nb | nbd | | nb | nbd |
| ACCFF | 0.8 | <1 | <1 | 0 | 0 | 0.04 | 12 | 7 |

*The amount of each of the components is indicated in mg/kg oil
+nb indicated neutralized and bleached; nbd indicated neutralized, bleached and deodorized.

The table shows that the synthetic bleaching solids are more effective in providing refined oil with low iron content (which is important for oxidative stability of the oil, because iron may catalyze undesirable oxidation reactions). Similarly, in the deodorized oil lower sulphur contents can be achieved, even when using less bleaching solid.

Some of the refined oils (all before deodorisation) were further analyzed for their tocopherol contents. It is desirable not to remove the tocopherols because they protect the oil against oxidation. The content of δ-tocopherol was less than 30 mg/kg oil in all samples. The contents of α- and γ-tocopherol were measured both via voltammetry and via HPLC. The average results of the analysis are shown in Table 4.

TABLE 4

| Bleaching solid/ Calcination temp. (°C.) | Amount of bleaching solid (wt. %) | α-tocopherol (mg/kg) | γ-tocopherol (mg/kg) |
|---|---|---|---|
| 700 | 0.5 | 380 | 530 |
| 800 | 0.5 | 420 | 550 |
| 900 | 0.5 | 380 | 510 |
| Tonsil ACCFF | 0.8 | 300 | 480 |

EXAMPLE 7

Alumina silica was prepared using a procedure essentially similar to the one described in Example 1. The product obtained was used to refine rapeseed oil as described in Example 6, using 0.5 wt. % of bleaching solid.

The filter cake (containing spent bleaching solid, adsorbed contaminants and oil) that was obtained from the bleaching process was regenerated by calcining it again for 1 hour at 700° C. After the calcination, the alumina-silica was white again and had the same appearance as before it had been used as bleaching solid. It was used again as the bleaching solid in a process to refine neutralized rapeseed oil, using substantially the same conditions as in the first run. The results were essentially the same. The filter cake obtained from this treatment was again calcinated at 700° C. and the regenerated material obtained, was used a third time as bleaching solid under the same conditions and with essentially the same results.

EXAMPLE 8

Alumina-silica was prepared as described in Example 5, but the calcination was carried out at 650° C. This material was used as bleaching solid to refine neutralized rapeseed oil.

After contacting the oil and the bleaching solid, using 0.6 wt. % bleaching solid, and maintaining the admixture for 20 minutes at 110° C., followed by filtration, 80% of the chlorophyll contained in the starting oil, had been removed. To achieve the same results, using varying amounts of Tonsil ACCFF as the bleaching solid and keeping the other process conditions the same, 1.1% of the Tonsil ACCFF to be used.

EXAMPLE 9

Alumina-silica was prepared as described in Example 5. The volume weighted mean diameter of the product was 52 μm. Batches of 60 kg each of neutralized palm oil were treated for 20 minutes at 90° C. using either 0.50 or 0.75 wt. % bleaching solid. The filtration rate was measured and the Lovibond red and yellow colours were measured in a 5¼" cell. For comparison the experiments were repeated using Tonsil ACCFF as bleaching solid instead of the synthetic alumina-silica. The results are shown in Table 5. The samples were subsequently deodorized and stored. The taste stability of all samples was good. After 12 weeks the flavour of all samples was still acceptable.

TABLE 5

| Bleaching solid | | Lovibond (5¼") | | filtration rate |
|---|---|---|---|---|
| Type | Amount (wt. %) | Y | R | (1/m²h) |
| alumina- | 0.50 | 23 | 2.3 | 2800 |
| silica | 0.75 | 25 | 2.5 | 10000 |
| Tonsil | 0.50 | 20 | 2.0 | 184 |
| ACCFF | 0.75 | 21 | 2.1 | 421 |

The table shows that with the synthetic alumina-silica much higher filtration rates can be achieved at essentially similar bleaching results.

EXAMPLE 10

A series of alumina silica's was prepared using the procedure described in Example 5, but using a higher amount of aluminum sulphate solution, resulting in an aluminum content expressed as mole fraction of the total aluminum and silicon content, of 0.20. The calcination time and temperature were varied. The average particle size of the products was 21 μm. Neutralized rapeseed oil was bleached at 90° C., contact time 20 minutes, using 0.5 wt. % alumina silica as bleaching solid. The results are shown in Table 6.

TABLE 6

| Calcination | | Colour removal | |
|---|---|---|---|
| time (hour) | temp. (°C.) | Yellow (%) | Green (%) |
| 1 | 650 | 58 | 54 |
| 2 | 650 | 56 | 35 |
| 3 | 650 | 58 | 54 |
| 1 | 750 | 63 | 68 |
| 2 | 750 | 63 | 68 |
| 3 | 750 | 65 | 45 |
| 1 | 850 | 68 | 71 |
| 2 | 850 | 73 | 75 |
| 3 | 850 | 61 | 45 |

The table shows that at 750° and 850° C. a calcination time as long as 3 hours has an adverse influence on the removal of green pigments. The bleaching performance of products calcined for 1 or 2 hours at 750° C. or 850° C. is better than of those calcined at 650° C.

The bleaching process was repeated using a product calcined for 2 hours at 850° C. but having an average particle size of 38 μm.

The pigment removal was essentially the same as with the corresponding product with an average particle size 21 μm.

EXAMPLE 11

Alumina-silica was prepared using the procedure described in Example 1, but the second reactor was bypassed. A somewhat higher amount of aluminum sulphate was employed resulting in an aluminum content, expressed as mole fraction of the total metal plus silicon content of 0.22. The silicon dioxide content of the product, calculated on the basis of the silicon content was 77 wt. %. The sodium content of the product was 0.4 wt. %. To test the bleaching properties of the product, it was used to bleach neutralized rapeseed oil for 20 minutes at 90° C. When using 1 wt. % the removal of yellow and green pigments was 93 and 81%, respectively. When 0 5 wt. % was used the removal was 78 and 85% of the yellow and green pigments, respectively.

The alumina-silica was then used for the decolourisation of non-edible tallow to be employed for soap-making. The absorbance at 400 nm was taken as a measure for the colour of the tallow. The treatment was carried out using 2, 4 or 8% bleaching solid and the contact time was varied. For comparison the experiment was repeated using 8 wt. % of Tonsil ACCFF as bleaching solid. The results are shown in Table 7.

TABLE 7

| Time (min.) | Pigment removal (%) | | | |
|---|---|---|---|---|
| | synthetic alumina-silica | | | Tonsil ACCFF |
| | 2% | 4% | 8% | 8% |
| 1 | 43 | 60 | 81 | 53 |
| 5 | 49 | 65 | 85 | 61 |
| 12 | 54 | — | — | 65 |
| 20 | 55 | 68 | — | — |
| 30 | — | — | 93 | 70 |
| 40 | 57 | — | — | — |
| 60 | — | — | 94 | 70 |

The table shows that when using 8% of bleaching solid, much better colour removal is obtained with the synthetic alumina-silica than with the reference product. When using only 4% of the synthetic alumina silica, still slightly better results are obtained than with 8% of the reference product.

We claim:

1. A process for refining fatty oil by treatment of the oil with a bleaching solid wherein the bleaching solid comprises an adsorbent which essentially consists of a synthetic calcined metal-oxide-silica, having a surface area at least 40% of which is contained in pores with radius of 2–4 nm and having a specific pore volume in pores with a radius in the range of 100–2000 nm of at least 0.5 ml/g.

2. A process according to claim 1, wherein at least 50 mole% of the metal contained in the metal-oxide-silica is a metal that can have an oxidation state higher than 2.

3. A process according to claim 2, wherein the balance of the metal contained in the metal-oxide-silica consists essentially of a metal selected from the group of alkaline earth metals.

4. A process according to claim 2, wherein the metal that can have an oxidation state higher than 2 is selected from the group consisting of aluminium, iron, zirconium, cobalt, manganese and mixtures thereof.

5. A process according to claim 4, wherein the metal that can have an oxidation state higher than 2 is aluminium.

6. A process according to claim 1, wherein at least 60% of the surface area of the adsorbent is contained in pores with radius of at least 2 nm.

7. A process according to claim 1, wherein said adsorbent has a total specific surface area of 250–550 $m^2/g$.

8. A process according to claim 1, wherein said adsorbent has a specific surface area in pores with radius of 2.0–4.0 nm of 100–500 $m^2/g$.

9. A process according to claim 1, wherein said adsorbent has a specific pore volume in pores with radius of up to 2000 nm of 1.5–4 ml/g.

10. A process according to claim 9, wherein said adsorbent has a specific pore volume in pores with radius of 100–2000 nm of 0.7–3 ml/g.

11. A process according to claim 1, wherein the metal-oxide-silica is X-ray amorphous.

12. A process according to claim 1, wherein said adsorbent has a volume-weighted mean diameter of 5–50 micrometres.

13. A process according to claim 1, wherein said adsorbent has a metal content, calculated as mole fraction of the total metal plus silicon content, of 0.1–0.3.

14. A process according to claim 1, wherein said adsorbent has a sodium content of less than 0.5% by weight.

15. A process according to claim 1, wherein the treatment comprises contacting the oil and the bleaching solid, and maintaining the contact for an adequate period of time at an elevated temperature.

16. A process according to claim 15, wherein the elevated temperature is at least 40° C.

17. A process according to claim 16, wherein the elevated temperature is 50°–200° C.

18. A process according to claim 1, wherein the adsorbent is used in an amount of 0.1–5% by weight of the oil.

19. A process according to claim 1, wherein the fatty oil is a triglyceride oil.

20. A process according to claim 1 or 19, wherein the fatty oil is an edible oil.

* * * * *